United States Patent [19]

Hann

[11] 4,440,015

[45] Apr. 3, 1984

[54] LOCOMOTIVE AIR BRAKE SYSTEM TESTING DEVICE

[76] Inventor: Dallas D. Hann, 818 Princeton St., Elkhart, Ind. 46514

[21] Appl. No.: 326,595

[22] Filed: Dec. 2, 1981

[51] Int. Cl.³ .............................................. G01M 3/02
[52] U.S. Cl. .......................................... 73/39; 73/121
[58] Field of Search .................................... 73/39, 121

[56] References Cited

U.S. PATENT DOCUMENTS 2,509,816  5/1950  Elson ........................................ 73/39
3,872,711  3/1975  Atkinson et al. ......................... 73/39

FOREIGN PATENT DOCUMENTS 135920  of 1915  United Kingdom ..................... 73/39

Primary Examiner—Gerald Goldberg
Assistant Examiner—Brian Tumm
Attorney, Agent, or Firm—Anthony G. Eggink

[57] ABSTRACT

A device for testing an air brake system of a locomotive, an air brake system having a compressed air source, a conduit for the ingress and egress of compressed air and a brake valve which is communicatively connected to both the compressed air source and the ingress/egress conduit. The device is particularly for testing the functionality of the brake valve of the air brake system. The testing device includes a trackside stand for placement in proximity to a locomotive servicing site, and a storage reservoir for holding a predetermined volume of compressed air. The trackside stand is further comprised of a conduit having one end for communicative connection to the storage reservoir and an opposite end for communicative connection to the ingress and egress conduit of the locomotive air brake system. Subsequent to the interconnection of the testing device to a locomotive air brake system, the various integrated functions of the brake valve can be tested by directing predetermined volumes of compressed air to and from the brake valve. The testing device also includes an air pressure testing gauge to determine the accuracy of the air pressure gauges of the locomotive air brake system, and an arrangement of pipe and testing conduits and shutoff valves permits one storage reservoir to be utilized in conjunction with a plurality of trackside stands.

10 Claims, 3 Drawing Figures

U.S. Patent  Apr. 3, 1984  4,440,015
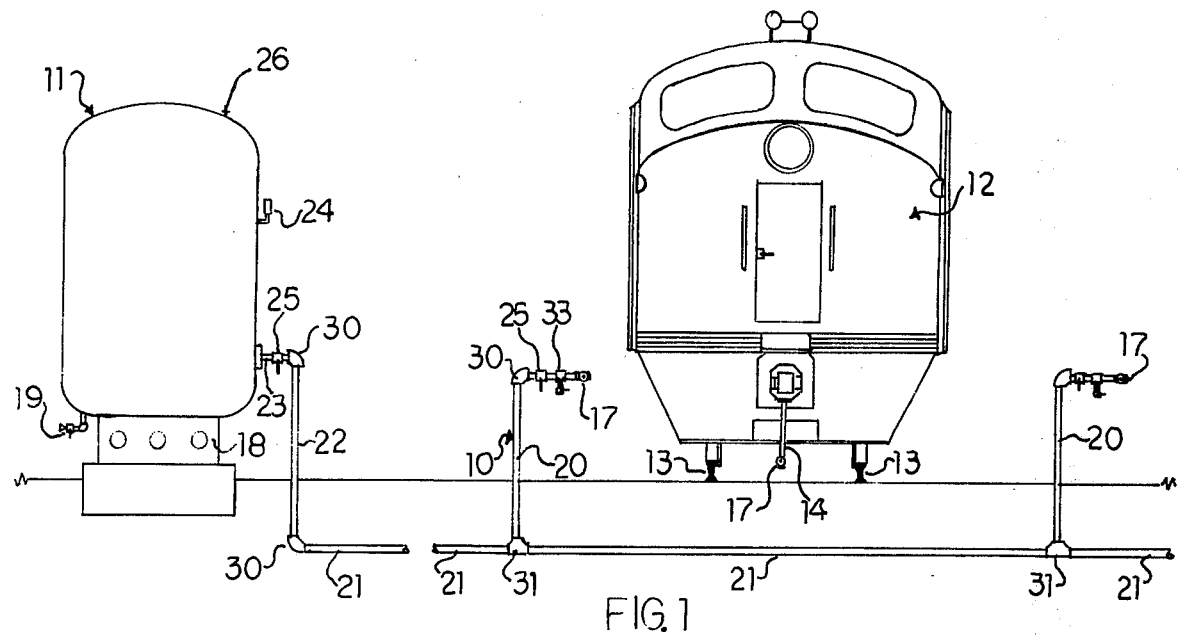
FIG. 1
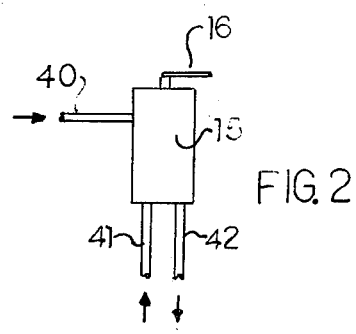
FIG. 2
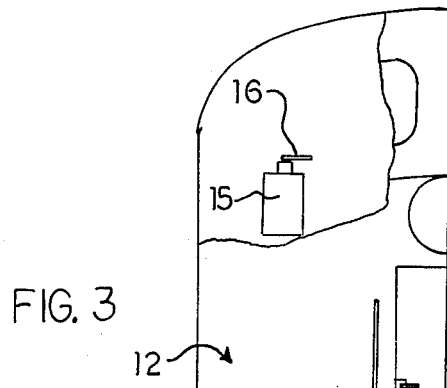
FIG. 3
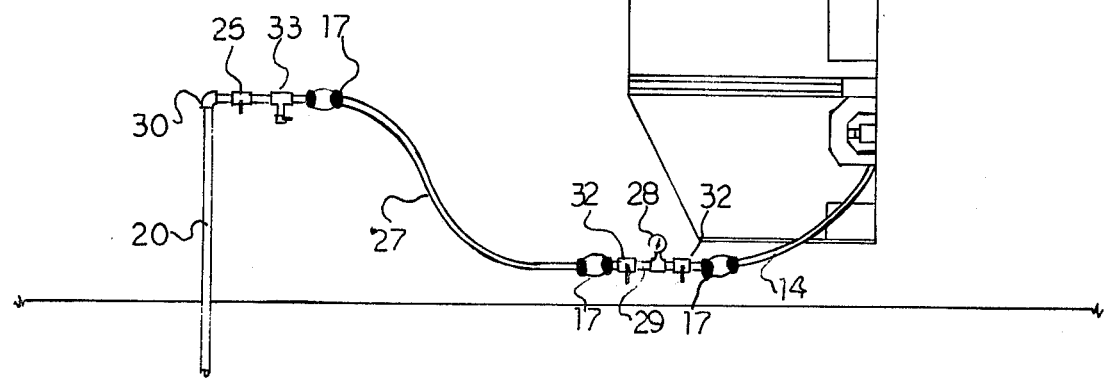

LOCOMOTIVE AIR BRAKE SYSTEM TESTING DEVICE

This invention relates to a device for testing an air brake system of a locomotive, an air brake system having a compressed air source, conduit means for the ingress and egress of compressed air and a brake valve which is communicatively connected to the compressed air source and the ingress and egress conduits. Particularly, this invention relates to a device for testing the operability and functionality of the component parts of a locomotive air brake system, and especially for testing the integrated functions of the system's brake valve.

Testing devices according to this invention are useful for providing railroad locomotive service centers with an effective, reliable and easy to utilize means for testing the operability of locomotive air brake systems at centralized sites, and they permit methods of testing the air brake systems without the costly, time consuming and ineffective methods that are presently utilized. The testing devices permit train brake applications which simulate the actual conditions for a train of predetermined length, and they permit the tests to be conducted at locomotive servicing sites without requiring the actual hookup of a locomotive air brake system to a length of train cars.

Despite the longstanding need for an effective, accurate and simple device to test the air brake system of a locomotive prior to transporting the locomotive from a servicing facility to a location for its attachment to a train of rail cars, nothing so far as is known has been developed. Only test devices and test methods, such as the utilization of orifice meters which measure the flow of compressed air have been employed at air hoses and air lines extending from the locomotive. However, these devices and methods are ineffective in measuring the functionality and operability of a locomotive air brake system, in that they measure only a facet or portion of its operation.

The air brake system of a locomotive includes a number of interrelated parts, and it has an air brake valve at the heart of its operation. The air brake system most widely utilized in U.S. and other North and South American railroad locomotives includes the commonly known 26-L brake equipment. Although the 26-L brake equipment is well known to those skilled in the art, and instructional booklets as to its operation exist as will be referred to below, a brief explanation of its component parts and its operation herefollows to aid in the understanding of the testing device and methods for testing of this invention.

The 26-L brake equipment utilizes a 26-C valve, a 26-F control valve and a relay valve as its major components for brake control of the locomotive and its train. The brake equipment is essentially a combination automatic and independent locomotive brake for the control of freight and passenger train braking systems. And, the 26-C brake valve provides the engineer or locomotive engine operator with means to initiate brake applications and releases on the locomotive, independent of the train or in conjunction with the train. The 26-F control valve which responds to the brake valve operations, develops and releases air pressure to the relay valve to apply and release the respective brakes.

In essence, it is the application of a volume of pressurized air and the subsequent release of volumes of pressurized air to predetermined pressures, through air lines or conduits, that set or release the brakes of a locomotive and its adjoining train. And, the brake valve of the air brake system is the component that controls the flow or release of that compressed air. By means of an operating handle which extends from the front face of a panel in the locomotive cab, the engineer is able to place the 26-C brake valve in generally six operating positions. The brake valve itself is generally mounted behind the panel atop a pipe bracket to which a number of various pipe connections are made. Thus, by means of the operating handle and a cut-off pilot valve, the locomotive engineer is able to control the air brake system of the locomotive and train by placing the handle portion in positions, known generally as, release, minimum reduction, service, suppression, handle-off, and emergency. Each particular position causes respective valves to function and, thereby, to cause the transport of compressed air or the maintenance of air pressure through and in the respective pipes or lines connected to the pipe bracket on which the brake valve is communicatively mounted.

The 26-C brake valve, as described above, is in essence a number of individual valve portions which interact by means of compressed air flow through the air lines or conduits and other valves of the air brake system of a locomotive. However, for purposes of this invention it is primarily important to note that the ingress and egress of compressed air to and from the air brake system of a locomotive by means of the brake valve permits the locomotive engineer to control the brakes of a locomotive and its adjoining train. It is the object of this invention to provide a testing device and testing methods for the air brake system of a locomotive to determine the functionality and operability of that system, and to provide a device that assimilates the working requirements of an air brake system in use on a train of predetermined length. Particularly, the testing device provides a means to determine the funcionality of the various components of a locomotive air brake system, and, especially, a means to determine whether problems, such as air leaks, exist in that system.

In summary, this invention provides a testing device for a locomotive air brake system. The device includes a trackside stand for placement in proximity to set of rail tracks on which a locomotive is serviced, and a storage reservoir for holding a predetermined volume of compressed air and which is in communication with the trackside stand. The trackside stand is further comprised of a conduit which is generally fixed at the trackside stand, and which on one end is communicatively connectable to the ingress and egress conduit of the air brake system of a locomotive and which on the opposite end is communicatively connected to the storage reservoir of the device. In addition, a number of above ground and below ground conduits or pipes, and a flexible test conduit, respectively connect the storage reservoir to the trackside stand and the trackside stand to the ingress and egress conduit of a locomotive air brake system. A number of shutoff valves are utilized on the conduits of the testing device to preserve the pressure in the storage reservoir when the testing device is not in use.

Additionally, this invention provides an air pressure testing means for use in conjunction with the remaining elements of the device to measure and to determine the accuracy of the air pressure guages that are part of a locomotive air brake system. The invention also provides means to permit a plurality of trackside stands to be used with one storage reservoir so that a number of locomotive service sites can be provided with the benefits of the invention at minimal expense. And to effectuate this latter benefit, the invention provides flexible testing conduit means having connecting means at opposite ends thereof for attachment to connector devices of a locomotive ingress and egress conduit means and to the trackside stand conduit.

And, provided by this invention are methods which utilize the devices of the invention to test the functionality and operability of the various component parts of a locomotive air brake system.

These and other benefits of this invention will become clear from the following description by reference to the drawings, wherein:

FIG. 1 is a schematic side plan view of a locomotive air brake system testing device of the invention, and which illustrates the storage reservoir and two trackside stands at a locomotive service site;

FIG. 2 is diagramatic view of an air brake system of a locomotive, and, particularly, of an air brake valve of that system; and, FIG. 3 is a schematic side plan view of a trackside stand of a testing device of the invention, and which shows the connective communication of the device to an ingress and egress conduit of an air brake system of a locomotive, as well as a cut-away view of a cab of a locomotive wherein the brake valve is located.

Referring to FIG. 1, the storage reservoir 11 and a trackside stand generally indicated as 10 are therein illustrated. The trackside stand 10 is shown as being in proximity to a locomotive service site, which is indicated by a locomotive 12 on tracks 13. The reservoir 11 is generally a cylindrical tank structure for holding a predetermined volume of compressed air. The storage reservoir or tank 11 is suitably constructed of a metal, such as steel, and is equipped with a safety valve 26, a pressure guage 24 and a drain valve 19. The reservoir 11 rests on a tank base 18, which sits on or is partially submerged in the ground, as shown.

The trackside stand 10 is comprised of a vertically extending conduit or pipe 20 having an elbow 30 at its upper end. Extending outward from elbow 30 in a generally horizontal direction is a section of conduit or pipe having a shut-off valve 25, a bleeder valve 33 and a connector means or connector device 17 at the end thereof. At the bottom of the upright conduit 20 is a T-joint 31 which allows the conduit 20 to be communicatively connected to storage reservoir 11 by means of underground conduit 21, conduits 22 and 23 and a pair of elbows 30. Although not shown, depending upon the stability of upright conduit 20 it may be desireable to have a vertically extending supporting structure, such as a post, next to conduit 20, and to which conduit 20 can be fastened by means of clamps.

The locomotive 12 illustrated at the service site has an ingress and egress conduit 14 with a connector end 17. Conduits similar to conduit 14 extend in this manner from both the front and rear end of a locomotive, and conduits of this type extend from generally all railroad cars equipped with air brake component systems. The connector ends illustrated in the drawings are known in the industry as glad hand connectors. These connectors permit communicative connections to be made by aligned and twisted motion of any two connectors. Thus, locomotives and cars can be readily interconnected by means of these glad hand connectors. Preferably, because of the universal character of these connectors, all connector means of the testing device of this invention are of the glad hand type.

FIG. 3 illustrates a locomotive having a cut-away at its cab portion and which shows the air brake valve 15 and its rotationally operable operating lever or handle 16. As discussed above, the locomotive engineer operates the movement of the locomotive and any adjoining train from within the cab, and the braking of the locomotive and adjoining train is accomplished by placing the operating handle 16 of the brake valve in one of the various positions.

FIG. 2 illustrates the basic diagramatic workings of the brake valve 15. In essence, the brake valve 15 is communicatively connected to a compressed air source and to ingress and egress conduits for the application of and the return of compressed air, respectively. The compressed air source of the air brake system communicates with brake valve 15 through conduit 40, as shown. The compressed air source of a locomotive generally comprises an air compressor powered by the diesel engine, and a compressed air tank which maintains a volume of compressed air at a predetermined pressure, i.e., 125 to 140 p.s.i. The brake valve 15 utilizes this compressed air internally to power its own brakes, and also utilizes this pressurized air source to send compressed air through a pipe or hose, shown diagramatically as 42, through the train line or the ingress and egress conduit 14 to release the brakes on train cars that are communicatively connected to the locomotive. Additionally, a conduit, diagramatically shown as 41, allows compressed air to be brought to the brake valve 15 from the train line and through the ingress and egress conduit so that it can be vented therethrough for purposes of applying the brakes of train cars that are communicatively connected to the locomotive. Thus, the brake valve located within the cab of the locomotive provides the operator or engineer with means to independently brake the locomotive and to operate the brakes on rail cars that are operationally connected to the locomotive at the ingress and egress conduit means 14.

Before describing the operability of the locomotive air brake testing device of the invention, the air brake system of a locomotive and its operation on the brakes of adjoining rail cars will be described. As a number of rail cars are connected to a locomotive, each unit is communicatively interconnected by air ingress and egress conduits that are similar to the means 14 illustrated in FIG. 1 and 3. As shown, a connecting device 17 is attached at the end of each of these conduits, and these connecting devices, known as glad hand connectors, permit any two such connectors to be operationally secured by rotational locking elements that are part of their respective structures. After assembling a train of cars in this fashion, all cars are, therefore, in airflow communication with the air brake system of the locomotive. The last rail car, usually the caboose, has its trailing ingress and egress conduit closed by means of a shut off valve which is operationally located at that conduit at both ends of every rail car and locomotive.

Subsequent to the attachment of a set of rail cars to a locomotive, the engineer is able, by means of brake valve 15, to send compressed air to each adjoining car through the interconnected brake line network or train line. This air pressure releases the brake shoes located at the wheels of each car by acting on their respective brake cylinders. The air pressure that is maintained in this train brake system by the air brake system of a locomotive depends upon the type of train and upon particular industry standards. Generally, however, an air pressure in the train brake system of 80 to 90 p.s.i. for freight trains, 90 p.s.i. for van trains, and 110 p.s.i. for passenger trains is common in the railroad industry. It is important to note that subsequent to charging the train brake system, that a reduction of air pressure causes the brake cylinders, and consequently the brake shoes, of the adjoining rail cars to be actuated to brake the train. And, that the release or venting of this compressed air takes place within the air brake system of the locomotive by means of the operation of the brake valve 15. Thus, to determine the functionality of the air brake system of a locomotive it is imperative to test both the ingress and egress of compressed air to and from the brake valve 15 of that system. Particularly, it is important to ensure that no leakage is evident in that system.

Referring to FIG. 1, and particularly to FIG. 3, the use and operation of the testing device of the invention is described. A flexible hose or conduit 27 having a connector or glad hand 17 attached at each end is connected to the connector or glad hand 17 of the trackside stand 10 and to the connector or glad hand 17 of the ingress and egress conduit 14 of a locomotive. Optionally, a testing conduit 29, having connector or glad hand 17 attached at each end, and an air pressure testing guage 28 operationally communicating therebetween is connected between the flexible hose or conduit 27 and the ingress and egress conduit 14 of a locomotive. On either side of testing guage 28 of the conduit 29 is a shut-off valve 32.

In use, with the testing device communicatively connected to a locomotive at the servicing site, as shown in FIG. 3, and with shut-off valves 32 and 25 in an open position, the storage reservoir 11 is initially charged to an air pressure normally utilized in a train brake system, for example, 80 p.s.i. The reservoir 11 is so charged by permitting its communication with the compressed air source of the locomotive, and which is accomplished by placing the handle 16 of brake valve 15 in the release or running position. The charging process, thus, tests the ability of the locomotive air brake system to release the brakes of a predetermined number of rail cars, and then its ability to replenish this volume of compressed air internally to its reservoir. As previously discussed, the volume of storage reservoir 11 is equal to the compressed air volume of a train having a predetermined number of cars. A storage reservoir 11 having a volume of approximately 70 cubic feet, which will approximate a normal brake application of a train having about 60 rail cars, has been found well suited for testing purposes.

Once the storage reservoir 11 is charged, a normal brake application can be made to test the ingress of compressed air from the reservoir for venting from the brake valve 15. Additionally, once charged the locomotive brake system can be checked for its ability to maintain a constant pressure. Thus, any leakage in the system will be detected before the locomotive is removed from the test site. With respect to a brake application, which requires the placement of operating handle 16 in the service position, a reduction or release of compressed air in the storage reservoir 11 by approximately 20 p.s.i. is effectuated. And, this reduction would normally result in the application of the brakes of a train. Thereafter, the reservoir 11 can again be charged. Thus, all operations of a locomotive air brake system can be tested with reliability, in that the device actually assimilates the conditions of a train. Additionally, by means of testing conduit 29, the air pressure gauges of the air brake system can be checked for accuracy and calibrated if necessary. Subsequent to testing, shut-off valve 25 is closed to maintain the air pressure within storage reservoir 11.

The air brake testing device of the invention provides a means to test the functionality of the locomotive air brake system in both the ingress and egress of compressed air directions. And, the device is utilized at a location where locomotives are normally serviced and filled with fuel, so that subsequent to leaving the service site a locomotive can be hooked to a train with confidence. It has been determined that the utilization of the devices of this invention will greatly reduce delays now experienced in the railroad industry.

As to trackside stand location, it has been found that location approximately nine feet from the track center is preferred. And, the use of $1\frac{1}{4}$ inch pipes for conduits 21, 22, 23 and 20 have been found well suited. As for elbows 30, and T-joints 31, which receive the threaded ends of the above mentioned conduits or pipes, any type of such devices can be utilized as known in the plumbing or piping industry, and whether threaded or otherwise fastenable. Valves 25 and 32 are of the type that allow the complete shut-off of compressed air flow in the off position and the bi-directional flow of air in the on position. Pressure release valve or safety valve 26 located on storage reservoir 11 is preferred to have a setting of 140 p.s.i. And, drain valve 19 located at the bottom of reservoir 11, and bleeder valve 33 located at trackside stand 10 provides means of removing water condensate from the testing device which is caused by the expansion and compression of air during repetitive testing procedures, as well as by ambient temperature changes.

The functionality of a locomotive air brake system is known to those that maintain the equipment, and various books and instruction pamphlets are relied upon. One such instructional manual entitled, "The 26-L Brake Equipment", and issued by The Railway Educational Bureau, gives specific detail of the operability of the 26-L brake equipment having the 26-C brake valve and 26-C control valve. And, the various malfunctions and remedies of 26-L brake equipment also are documented therein for use by those that are trained to repair the various elements or components of the equipment.

As described above, the 26-L brake equipment is complex and ultimately important to the proper functionality and profitability of a railroad train. The many components, of particularly the 26-C brake valve, have limited life spans, and, therefore, need periodic repair and/or replacement. Among these components are O rings for the various individual valves that make up the brake valve, i.e., the emergency, pilot, selector, regulating, release, check, relay valves, etc. And, to those skilled in the art, each defective O-ring, and other malfunctions are indicated by air leaks at particular locations of the air brake system. These malfunctions are all easily detected by the testing device of this invention.

As many changes are possible to the embodiments of this invention, utilizing the teachings of the invention, the descriptions above and the accompanying drawings should be interpreted in the illustrative and not in the limited sense.

That which is claimed is:
1. An air brake testing device for a locomotive air brake system, the air brake system having a compressed air source, a conduit connectable to rail cars for the ingress and egress of compressed air and a brake valve which is communicatively connected to both the compressed air source and to the ingress and egress conduit of the air brake system, said testing device being primarily for testing the functionality of the brake valve of the brake system, said device comprising:

a. a storage reservoir essentially for holding compressed air and having a volume which is generally equal to a volume of a braking system for a predetermined number of rail cars, said storage reservoir additionally having a pressure gauge, an air pressure safety valve and a bleeder valve, and, b. a trackside stand having a conduit with opposing ends, one said end being communicatively connected to said storage reservoir and said opposite end having connecting means and being communicatively connectable to the ingress and egress conduit of the locomotive air brake system, said stand further having a flexible testing conduit with connecting means at opposing ends to communicatively attach said flexible conduit between said trackside stand conduit and the ingress and egress conduit of a locomotive, whereby, the communicative connection of said connecting means of said trackside stand conduit and said flexible testing conduit to the ingress and egress conduit of the locomotive air brake system permits the operability and functionality of the locomotive air brake system to be tested by said testing device at said trackside stand by causing the flow of compressed air of the locomotive air brake system to and from said storage reservoir without the requirement of having to actually communicate the locomotive air brake system to a number of rail cars of a predetermined number.

2. The air brake testing device of claim 1, wherein said connector means of said flexible conduit, and wherein said connector means of said trackside stand are connecting devices known as glad hand connectors.

3. The air brake testing device of claim 1, wherein said trackside stand conduit is a vertically extending rigid pipe and having its bottom end extending at least partially underground before its communicative connection to said storage reservoir.

4. The air brake testing device of claim 3, wherein said underground, bottom end of said vertically extending rigid pipe additionally has second conduit means communicatively connected thereto, said second conduit means extending underground for connection to at least a second trackside stand, and wherein said trackside stand conduit has valve shut-off means.

5. A method for testing the operability and functionality of the components of a 26-L locomotive air brake system, and particularly the brake valve of the brake system, said test method comprising:

a. providing an air brake testing device comprising:

1. a storage reservoir for holding compressed air and having a volume which is generally equal to a volume of a braking system for a predetermined number of rail cars, said storage reservoir additionally having a pressure gauge, an air pressure safety valve and a bleeder valve, and, 2. a trackside stand having a conduit with opposing ends, one said end being communicatively connected to said storage reservoir and said opposite end having connecting means and being communicatively connectable to an ingress and egress conduit means of the 26-L locomotive air brake system, said stand further having a flexible testing conduit with connecting means at opposing ends to communicatively attach said flexible testing conduit between said trackside stand conduit and the ingress and egress conduit means of a locomotive, b. communicatively connecting the ingress and egress conduit means of the 26-L locomotive air brake system to the trackside stand conduit by means of said flexible testing conduit of said testing device, c. operating the brake valve of the 26-L locomotive air brake system to send compressed air to and returning compressed air from said storage reservoir of said testing device, and, d. observing the brake valve functionality of the 26-L locomotive air brake system to determine if any air leaks exist in that system, and to determine if the brake valve is operating properly.

6. An air brake testing device for a 26-L locomotive air brake system having a compressed air source, conduit means for the ingress and egress of compressed air and a brake valve which is communicatively connected to both the compressed air source and to the ingress and egress conduit means of the 26-L air brake system, said testing device being primarily for testing the functionality of the brake valve of the brake system, said device comprising:

a. a storage reservoir essentially for holding compressed air and having a volume which is generally equal to a volume of a braking system for a predetermined number of rail cars, b. a trackside stand having a conduit with opposing ends, one said end being communicatively connected to said storage reservoir and said opposite end having connecting means and being communicatively connectable to the ingress and egress conduit means of the 26-L locomotive air brake system, c. air pressure testing conduit means having a pressure gauge and having connector means for insertion between said trackside stand conduit and the ingress and egress conduit means of the locomotive air brake system, and d. a flexible testing conduit with opposing ends, each end having connector means attached thereto, said flexible testing conduit for insertion between said trackside stand conduit and the ingress and egress conduit means of the locomotive air brake system to communicatively connect said storage reservoir to the air brake system, whereby, the communicative connection of said connecting means of said trackside stand conduit to the ingress and egress conduit means of the 26-L locomotive air brake system by means of said flexible testing conduit, permits the operability and functionality of the locomotive air brake system to be tested by said testing device at said trackside stand by causing the flow of compressed air of the locomotive air brake system to and from said storage reservoir without the requirement of having to actually communicate the locomotive air brake system to a number of rail cars of a predetermined number, and, whereby, subsequent to the communicative connection of said connecting means of said trackside stand conduit to the ingress and egress conduit means of the 26-L locomotive air brake system additionally permits the testing of the accuracy of the locomotive air brake system air pressure gauge.

7. The air brake system of claim 6, wherein said connector means of said flexible conduit, and wherein said connector means of said trackside stand are connecting devices known as glad hand connectors.

8. The air brake system of claim 6, wherein said trackside stand conduit is a vertically extending rigid pipe and having its bottom end extending at least partially underground before its communicative connection to said storage reservoir.

9. The air brake system of claim 8, wherein said underground, bottom end of said vertically extending rigid pipe additionally has second conduit means communicatively connected thereto, said second conduit means extending underground for connection to at least a second trackside stand, and wherein said trackside stand conduit has valve shut-off means.

10. The air brake system of claim 8, wherein said storage reservoir has shut-off valve means, a bleeder valve, an air pressure safety valve and a pressure gauge.

* * * * *